Jan. 7, 1969         J. A. KITZINGER         3,419,972
EDUCATIONAL AID FOR USE IN DEVELOPING ABILITIES IN THE
IDENTIFICATION AND MANIPULATION OF NUMBERS
OR OTHER INDICIA
Filed Sept. 21, 1966

INVENTOR
JOSEPH A. KITZINGER

BY Fisher, Christen, Sabol & Caldwell
ATTORNEYS

United States Patent Office 3,419,972
Patented Jan. 7, 1969

3,419,972
EDUCATIONAL AID FOR USE IN DEVELOPING ABILITIES IN THE IDENTIFICATION AND MANIPULATION OF NUMBERS OR OTHER INDICIA
Joseph A. Kitzinger, 309 W. Edmonston Drive, Rockville, Md. 20851
Filed Sept. 21, 1966, Ser. No. 581,005
U.S. Cl. 35—31      3 Claims
Int. Cl. G09b 19/02; G09b 23/02

ABSTRACT OF THE DISCLOSURE

An educational aid for use in exercising arithmetical abilities comprising a container having a plurality of gates arranged along one end thereof with consecutive numbers associated therewith, at least one spherical marker adapted to roll in the container and fall into the gates and a stand for supporting the container in a substantially vertical viewing plane with the gates at the lower end and pivoting the container so that the spherical marker will roll away from the gates whereby arithmetical calculations may be practiced utilizing the numbers associated with the gates into which the marker falls as the container is pivoted to the viewing plane.

---

This invention relates to training or educational aids and more specifically is directed to devices and methods for teaching students to recognize and perform arithmetical calculations with numbers.

It has been proven that mentally retarded persons can be taught and trained to use their mental faculties to make their lives more satisfying to themselves and to those close to them. In many cases, they can be trained to perform useful tasks, thus contributing to society and providing them with further gratification and more enjoyment in life. One important difficulty experienced by mentally retarded persons is their limited time span of attention and powers of concentration. As soon as their attention span and powers of concentration are improved they begin to learn at a more rapid pace. Another difficulty is their lack of confidence in their abilities resulting in a strong reticence when faced with new, unfamiliar objects and situations. They are far more communicative and disposed to exercise their abilities when faced with familiar objects and uncomplicated situations.

This invention is especially useful in the instruction of mentally retarded persons where powers of concentration and spans of attention are lacking or limited in that motion and sound accompany the operation of the novel devices and methods.

The present invention has been used to instruct mentally retarded persons and has been found to be extremely successful in holding their attention and motivating them to practice number identification and various number combinations and arithmetical calculations.

The devices of this invention are extremely simple to operate and can be operated by the mentally retarded person himself or by an instructor. The moving parts of the devices are familiar objects, i.e., marbles or balls, and the mentally retarded operators have been found to have no fear or hesitancy in operating the devices. The movements and sounds produced by the devices in operation attract and hold the attention of the mentally retarded person and assist him in developing his powers of concentration and in learning to focus his attention over longer periods of time.

While the invention has been found to be remarkably well suited for use in instructing mentally retarded children, it is also well suited for teaching young children who are fortunate in not being afflicted with mental retardation. Normal children of an early age have short spans of attention and are in need of developing and improving their powers of concentration. The devices and methods of this invention can be used to help them develop and improve such powers.

Additionally, normal children approaching or in the kindergarten age bracket, as well as first, second and third grade students, will be able to readily learn, practice and improve the ability to identify numbers and add, substract, multiply and divide numbers through the use of this invention.

It is a principal object to provide devices and methods which will attract and hold the attention of persons of limited mental capacity while training them in the identification and/or use of numbers, letters or other indicia.

Another object is the provision of methods and devices for assisting persons of limited mental capacity in developing and improving powers of concentration.

Further objects and advantages will be apparent from the following detailed description taken in conjunction with the attached drawings in which.

Referring to figures, there is shown in FIGS. 1 through 4 one embodiment of a device under this invention. In this embodiment there is provided a container 1 having a bottom or base panel 2 presenting an upper surface on which spherical objects can be rolled. Fixed to the bottom 2 are surrounding walls 3, 4, 5 and 6. The manner in which the surrounding walls are fixed to each other and to the bottom 2 is not narrowly critical and nailing, bonding with adhesives, attachment with screws or any other mode of attachment can be employed. If desired, the bottom 2 and surrounding walls 3, 4, 5 and 6 can be an integral part such as obtained through plastic molding.

Figure 1:
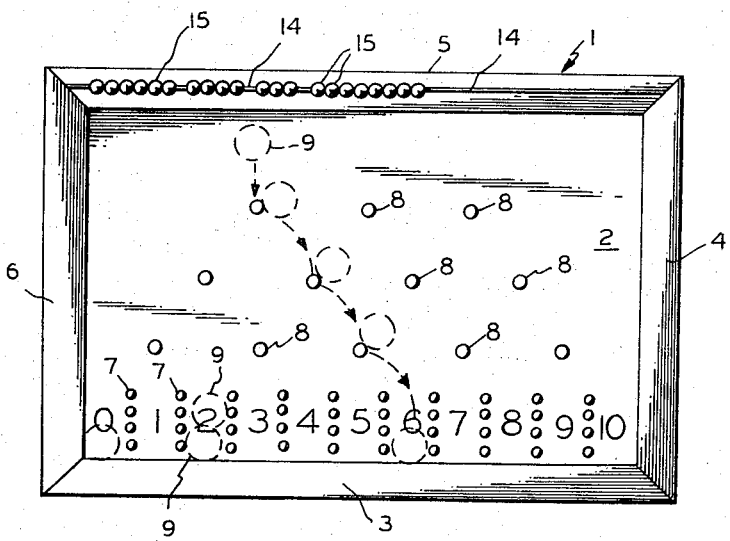
FIG. 1 is a plan view of one embodiment of this invention.
Figure 4:
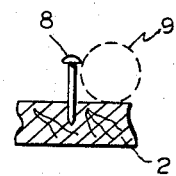
FIG. 4 is a partly cut away fragmentary view of the deflecting object used in the embodiment of FIG. 1.

Several objectives are defined along one wall, i.e, wall 3, as shown in FIG. 1, and these objectives may be defined by means of nails or pins 7 driven into the upper surface of bottom 2 so as to form separate gates. As shown in FIG. 1, four pins 7 are driven into the bottom 2 in a line parallel to the walls 4 and 6. Additional lines of four pins each spaced from each other line are provided to form eleven gates. Altogether ten lines of four pins each are provided to form the eleven gates. Each gate is identified with a numeral from 0 to 10, as shown in FIG. 1.

Deflecting objects or pins 8 are also driven into the upper surface of bottom 2 in order to present a deflecting pin field. The deflecting pins 8 can be positioned in a definite pattern or can be randomly positioned, as desired. It will be noted that the deflecting pins 8 are positioned between the gates or gate pins 7 and the side wall 5 such that when a spherical object is rolled from the vicinity of wall 5 it must pass by the deflecting pins or be deflected by them in order to roll to the gates or gate pins 7. As shown in phantom in FIGS. 1 and 4, a spherical object 9, such as a marble or metal or plastic ball or ping pong ball, is also provided.

Figure 2:
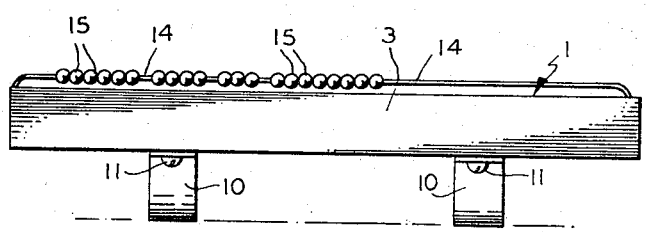
FIG. 2 is a front elevational view of the embodiment shown in FIG. 1.
Figure 5:
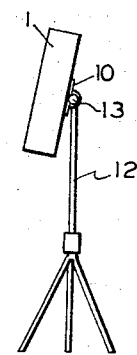
FIG. 5 is a side elevational view illustrating another mode of supporting devices of this invention.
Figure 3:
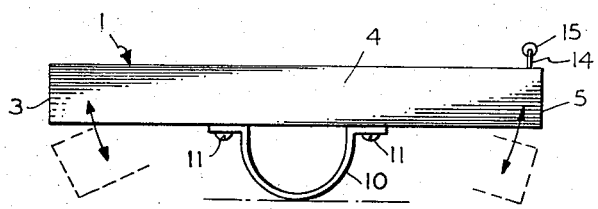
FIG. 3 is a side elevational view of the embodiment shown in FIG. 1.

As best shown in FIGS. 2 and 3, the under side of container 1 is provided with pivot means which, as shown, are semi-circular brackets 10. These brackets are secured to the under side of the container 1 by means of screws 11. The brackets 10 permit the tilting of the container 1 about an axis substantially parallel to walls 3 and 5, as best shown by the dotted lines and arrows in FIG. 3. If desired, dowling, such as a one-inch dowl rod, can be secured to the under side of the container 1 instead of the brackets 10. The dowling would thus be secured in a position parallel to walls 3 and 5 and they can be secured with nails, screws or adhesives. As pointed out above, the container 1, the pivot means 10, as well as the pins 7 and 8, can be made of one piece molded plastic if desired.

The device shown and described in FIGS. 1 through 4 can be adapted for classroom instructional purposes by providing a transparent cover across the top of the walls 3, 4, 5 and 6. The container 1 can then be mounted on an easel or other support 12 which is provided with substantially horizontal pivot pins 13 which pass through brackets 10. Alternatively, if a dowling is employed as the pivot means, such dowling can be cut oversize so as to extend beyond the wall ends of the container 1. The portions of the dowling extending beyond the container 1 then can be rotatably supported by suitable bushings provided on the easel 12. If intended for classroom instruction by a teacher or instructor, the container 1 can be made of a large size and ping pong balls can be employed to facilitate visibility from all points in the classroom. Of course, the objectives or gates would have to be of a larger size so as to be able to receive the ping pong ball marker.

In operation, the container 1 is pivoted on brackets 10 so as to dispose the gates in the lowermost position. The spherical object or marker, i.e., marble or steel ball 9, is then placed on the upper surface of bottom 2 in the vicinity of wall 5 and released to roll downwardly towards the gates. In rolling towards the gates, the spherical marker invariably is deflected by the deflecting pins 8 such that there is an element of chance as to which gate the marker 9 will enter. If the student is simply practicing number identification, he will simply identify the number of the gate into which the marker 9 rolls. If the student is practicing the various arithmetical calculations, such as addition, subtraction, multiplication or division, two markers 9 are rolled down the surface and the student is called upon to add the numbers of the gates into which the markers enter, subtract the lesser number from the greater number, multiply the two, and/or divide the greater number by the lesser number. In the case of practicing addition, more than two markers can be rolled, for example, 3, 4 or more, and the student is then called upon to total all the numbers of the gates into which the markers have rolled. In the case of multiplication, one number can be fixed and the other number determined by the gate into which the marker rolls. For example, in practicing the multiplication tables of 6, the marker would be rolled and the number of the gate into which it enters would be multiplied by 6. Other numbers can be fixed so that the student is able to practice the entire range of mulitplication tables.

It will be understood that the rolling of the marker or markers can be repeated simply by tipping the container 1 on the pivot means 10 to dispose the wall 5 in the lowermost position so that the marker or markers roll back to wall 5. Then the container 1 is tilted back on pivot means 10 to dispose wall 3 and the gates in the lowermost position.

A student may also practice his ability to identify place values by using a different color for the markers. Thus, one color such as blue can be assigned to the numbers 0 through 9, red can be assigned the value of tens, i.e., 10, 20, 30, 40, etc., and green can be assigned to the marker indicating the hundreds, i.e., 100, 200, 300, 400, etc. When the different colored markers are rolled, the student would then add or multiply the proper numbers or place values assigned to the marker and gate into which it enters. Similarly, large digit numbers can be practiced by permitting numerous markers to roll into the gates and then requiring the student to read the large digit number indicated by the numbers of the gates into which the markers have rolled.

If desired, the upper surface of bottom 2 can be covered with felt to reduce noise; for example, when the device is to be put to regular classroom use where noise might be considered to be disruptive.

It thus is to be noted that the present invention also provides a method of education which includes the steps of providing an inclined surface and one or more objects for movement on such surface in response to gravitational force, providing a plurality of obstructions on said surface for diverting said object or objects randomly, providing a plurality of spaced objectives on said surface below the level of said obstructions, placing said object or objects on said surface above the level of said obstructions, removing the object or objects from the surface after it has or they have reached an objective and repeating said steps, the number of repetitions being dependent upon the identity of the objective or objectives previously reached by said object or objects.

Many modifications and combinations can be made to the device as shown and described above. For example, a wire rack 14 can be mounted on the container 1, e.g., above wall 5. Numerous beads 15 of any desired shape are slideably mounted on the wire rack 14. Such an arrangement will provide the student with an aid in making arithmetic totals based on the numbers indicated by the gates into which the marker or markers 9 have rolled. The rack 14, of course, can be mounted at any convenient position on container 1.

It is to be clearly understood that the foregoing description relates only to one embodiment of the present invention and the scope of the present invention is not to be limited in any way because of the foregoing detailed description.

What is claimed is:

1. A training aid for use in exercising a participant's arithmetical abilities comprising a container having a planar base panel, an upstanding wall surrounding said base panel having a first portion and a second portion, a plurality of gates arranged along said first portion of said upstanding wall, said gates having consecutive numbers associated therewith, and a plurality of pins protruding from said base panel to define a deflecting field between said first and second portions of said upstanding wall; at least one spherical marker adapted to roll on said base panel; pivot means attached to said container; supporting means for said container including a stand having receiving means for said pivot means for supporting said container in a substantially vertical viewing plane in which said first portion of said upstanding wall is lower than said second portion of said upstanding wall so that said marker is caused to enter one of said gates by gravity, said receiving means being operable with said pivot means to permit pivoting of said container out of said viewing plane so that said second portion of said upstanding wall is lower than said first portion of said upstanding wall to cause said marker to roll to said second portion by gravity whereby pivoting of said container to its viewing plane permits gravity to cause said marker to roll through said deflecting field to be collected in one of said gates.

2. The invention as recited in claim 1 wherein there is included a plurality of spherical markers of different colors.

3. The invention as recited in claim 1 wherein a wire rack is mounted on said container and a plurality of beads are slideably mounted on said wire rack.

References Cited

UNITED STATES PATENTS

| | | | |
|---|---|---|---|
| 454,254 | 6/1891 | Cohn | 273—110 |
| 797,105 | 8/1905 | Graves | 273—110 |
| 884,605 | 4/1908 | McEvoy | 273—110 |
| 1,144,487 | 6/1915 | McGinley | 35—33 |
| 2,248,859 | 7/1941 | Ferreri | 273—110 |

ENGENE R. CAPOZIO, *Primary Examiner.*

W. GRIEB, *Assistant Examiner.*

U.S. Cl. X.R.

273—110